(12) United States Patent
Rose-Poetzsch et al.

(10) Patent No.: US 11,936,168 B2
(45) Date of Patent: Mar. 19, 2024

(54) PRESSURE RELEASE DEVICE AND METHOD FOR OPERATING A PRESSURE RELEASE DEVICE

(71) Applicant: Siemens Energy Global GmbH & Co. KG, Munich (DE)

(72) Inventors: Alexander Rose-Poetzsch, Panketal (DE); Christian Bradler, Falkensee (DE); Tom Fedtke, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 720 days.

(21) Appl. No.: 17/050,921

(22) PCT Filed: Apr. 9, 2019

(86) PCT No.: PCT/EP2019/058905
§ 371 (c)(1),
(2) Date: Oct. 27, 2020

(87) PCT Pub. No.: WO2019/206618
PCT Pub. Date: Oct. 31, 2019

(65) Prior Publication Data
US 2021/0234344 A1    Jul. 29, 2021

(30) Foreign Application Priority Data
Apr. 27, 2018   (DE) .................... 10 2018 206 572.1

(51) Int. Cl.
*H02B 1/30*      (2006.01)
*H02B 13/025*    (2006.01)

(52) U.S. Cl.
CPC ............. *H02B 13/025* (2013.01); *H02B 1/30* (2013.01)

(58) Field of Classification Search
CPC .. H02B 13/025; H02B 13/035; H02B 13/045; H02B 1/56; H05K 5/00
USPC ........ 200/306, 291; 218/35, 99, 106; 174/50
See application file for complete search history.

(56) References Cited

U.S. PATENT DOCUMENTS

| | | | |
|---|---|---|---|
| 6,407,331 B1 | 6/2002 | Smith et al. | |
| 9,438,015 B2* | 9/2016 | Arcos | H02B 13/025 |
| 9,525,276 B2* | 12/2016 | Farr | H01H 33/53 |
| 9,608,415 B2* | 3/2017 | Cardin | H02B 13/025 |
| 9,899,810 B2* | 2/2018 | Pawar | H02B 1/565 |
| 2016/0042896 A1* | 2/2016 | Kingston | H01H 33/53 218/157 |
| 2017/0343234 A1* | 11/2017 | Pearce | F24F 13/08 |
| 2017/0365987 A1* | 12/2017 | Ionescu | H01H 9/341 |

FOREIGN PATENT DOCUMENTS

| | | |
|---|---|---|
| CN | 202308887 U | 7/2012 |
| CN | 202797651 U | 3/2013 |
| CN | 203135245 U | 8/2013 |
| CN | 104242101 A | 12/2014 |

(Continued)

*Primary Examiner* — William A Bolton
(74) *Attorney, Agent, or Firm* — Laurence A. Greenberg; Werner H. Stemer; Ralph E. Locher

(57) ABSTRACT

A pressure release device includes a movable pressure release wall that can be moved relative to a pressure release opening. The pressure release wall, by virtue of its position relative to the pressure release opening, controls the passability of the opening. A detent stop is arranged in a path of movement of the pressure release wall.

11 Claims, 3 Drawing Sheets

(56) References Cited

FOREIGN PATENT DOCUMENTS

| | | |
|---|---|---|
| CN | 204793762 U | 11/2015 |
| CN | 205407079 U | 7/2016 |
| CN | 205489240 U | 8/2016 |
| CN | 206116992 U | 4/2017 |
| CN | 106898954 A | 6/2017 |
| CN | 207098375 U | 3/2018 |
| CN | 207765859 U | 8/2018 |
| DE | 7508952 U | 7/1975 |
| DE | 7731384 U1 | 2/1978 |
| DE | 2915431 A1 | 10/1980 |
| DE | 8108217 U1 | 6/1983 |
| DE | 3840239 A1 | 5/1990 |
| DE | 29807895 U1 | 8/1998 |
| DE | 102014116473 A1 | 5/2016 |

* cited by examiner

PRESSURE RELEASE DEVICE AND METHOD FOR OPERATING A PRESSURE RELEASE DEVICE

BACKGROUND OF THE INVENTION

Field of the Invention

The invention relates to a pressure release device having a pressure release wall which controls a passability of a pressure release opening and is movable relative to the pressure release opening.

It is known for a movable pressure release wall to be disposed on pressure release openings, wherein the passability of the pressure release opening is controlled by a movement of the movable pressure release wall relative to the pressure release opening. Pressure release devices of this type are used, for example, in electrical switching installations, for example with electrical cabinets, so as to allow an overload pressure to escape through the pressure release opening in the case of a malfunction. Major damage is intended to be prevented in this way. Achieving as fast as possible a pressure drop is often the primary objective. An undesirable movement of the pressure release wall, or an undefined discharge of particles and fluids ejected by the overload pressure, can arise herein.

SUMMARY OF THE INVENTION

As a result, the object of the invention is to design a pressure release opening in such a manner that the latter enables improved control of exiting particles and fluids.

According to the invention, the object in a pressure release device of the type mentioned at the outset is achieved in that a detent is disposed in a motion path of the pressure release wall.

A pressure release device is used, for example, on housings, in particular on housings of power transmission devices such as encapsulation housings, electrical cabinets, etc., so as to be able to rapidly relax overload pressures that possibly arise in the interior and to thus prevent any major destructive effect. As such, a pressure release device can form a defined weak point in a wall. The pressure release wall herein typically straddles a pressure release opening and largely plugs the latter. The pressure release wall optionally also hermetically seals the pressure release opening. A movement of the pressure release wall relative to the pressure release opening takes place in a response of the pressure release device. This means that the plugging effect of the pressure release opening on account of the pressure release wall is cancelled on account of a relative movement between the pressure release wall and the pressure release opening, on account of which exiting of fluids, in particular gases, or particles, which cause a pressurization, is enabled. For example, the pressure release wall herein can be reversibly deformed, irreversibly deformed, burst, be fastened on hinges, etc. For example, the pressure release wall can be established on one side of the pressure release opening and be held down on another side of the pressure release opening, for example by a hold-down device. However, it can also be provided that the pressure release wall for generating a movement relative to the pressure release opening is subjected to bursting such that the pressure release wall carries out a movement relative to the pressure release opening while being destroyed. By disposing a detent in a motion path of the pressure release wall, the opening, or the exposure, respectively, of the pressure release opening by the pressure release wall can be influenced by the detent. Exposing the pressure release opening in a stepped manner is enabled, for example. For example, the detent can at least temporarily offer resistance to a movement of the pressure release wall and optionally, under the effect of the latter, be subjected to a variation of shape or destruction, etc. A directional effect for the exiting fluid can be caused by the pressure release wall per se, at least during the time when the detent becomes effective, that is to say within the time during which the detent offers a mechanical resistance to the pressure release wall and at least in portions impedes the latter in terms of any further movement. For example, it is thus possible for fluid or particles exiting from the pressure release opening to be deflected. The pressure release wall, like the detent, can act as a deflector. It is thus possible, for example, for a fluid flow to be initially deflected and for the flow path upon exiting the pressure release opening to be extended in length and to thus facilitate the fluid flow in terms of being swirled in the surrounding atmosphere, for example. Directing a fluid to non-critical regions can take place, for example. Operator aisles and similar locations where people are able to be present are preferably to be protected against any effect of the exiting fluid.

A further advantageous design embodiment can provide that the pressure release wall has a first pivot point, wherein a second pivot point is disposed in the pressure release wall.

The pressure release wall can have a first pivot point which is implemented, for example, by a fixing point of the pressure release wall in a peripheral region of the pressure release opening. The pivot point can be aligned in a manner of an axis which runs in a linear (straight) manner, for example, wherein the pressure release device has a hinge, for example, or another pivoting means so as to effect repeated opening and closing of the pressure release opening by means of the pressure release wall. However, it can also be provided that the pivot point is defined by a perforation, for example, or generally by a shaping of the pressure release wall such that a predefined first pivot point is provided by a bending edge. A second pivot point can in this instance be disposed in the pressure release wall, wherein a movement of the pressure release wall about the first pivot point initially takes place, and a movement of the pressure release wall toward the detent subsequently takes place. A second pivot point about which the pressure release wall at least in portions can be further deflected can be activated by way of contact between the pressure release wall and the detent. A deformation of the pressure release wall herein can be performed at the first pivot point as well as at the second pivot point. The first pivot point herein can form a counter bearing for the second pivot point so as to achieve that the pressure release wall is deflected or formed, respectively, about the second pivot point. Forming in two stages can thus take place at defined pivot points, for example. The second pivot point preferably lies in a portion of the pressure release wall that is moved conjointly with an exposure of the pressure release opening. In the case of the linear profile a parallel alignment of the pivot points can preferably be provided.

It can advantageously be provided that the detent is supported by at least one guide element for the pressure release wall.

Guide elements of the pressure release wall are used for preventing tipping or tilting of the pressure release wall in the event of a movement. For example, it is thus possible that the pressure release wall is moved about a first pivot point, or a first pivot axis, respectively wherein linear guiding is formed by the guide element. For example, said guide elements make available faces along which the pressure release wall is moved by way of sides, for example. The guide elements, or at least one of the guide elements, respectively, can be contacted in the event of the pressure release wall tipping. A defined articulation of the pressure release wall about a first pivot point is generated on account thereof. This is particularly advantageous in order for a defined bearing action of the pressure release wall on the detent to be achieved. A movement about the second pivot point can thus take place in a preferred manner. No contact between the pressure release wall and any guide element takes place in the case of an ideal movement. When the detent is contacted, a further pivoting movement about the second pivot point can then be performed at least by portions of the pressure release wall. The guide elements herein ensure that the pressure release wall is deformed in a defined manner until the detent is reached, said pressure release wall subsequently being subjected to further deformation about the detent. The guide elements can preferably have compact faces such that said faces alternatively or additionally assume a fluid-guiding function. For example, the guide elements can be part of a duct or a hood, etc., for guiding a fluid flow. For example, a duct can be formed while utilizing a planar detent, wherein the guide elements perform a lateral delimitation.

It can advantageously be provided herein that the detent at least partially straddles the pressure release opening.

The detent can preferably extend so as to be spaced apart from the pressure release opening and so as to be at least partially above the pressure release opening, and can thus run above the ejection direction of the pressure release opening. On account thereof, the pressure release opening can impact on the detent in a simple manner so as to initially enable an acceleration of said pressure release wall. Forming of the pressure release wall can take place once the detent has been reached. When compact walls are utilized for the guide elements, said guide elements can guide a movement of the pressure release wall and/or perform guiding of an exhaust gas flow. Angular deflectors can be formed in the interaction herein between a guide element and the pressure release wall or the detent, respectively, so as to promote directing of fluids exiting from the pressure release opening. Guiding of the fluid flow can thus be performed. The detent can have a compact face, for example, such that the detent per se can serve for directing a fluid flow. On account of the pressure release opening being straddled by means of the detent it is possible for the pressure release opening by way of the cross-sectional face thereof to be utilized for an outflow of a pressurized fluid, on the one hand, wherein a deflection of fluids which preferably exit the pressure release opening in a vertical direction is already enabled by way of the detent, or the pressure release wall which impacts the detent, respectively, above the pressure release opening. A fundamental alignment of the outflowing fluid, or influencing the direction of the latter, respectively, independently of the position or the state, respectively, of the pressure release wall can be achieved in particular in the case of a planar design embodiment of the detent, that is to say in the form of a wall, for example, which for straddling the pressure release opening protrudes into the region above the pressure release opening. For example, a pressure release wall can have a planar detent in a planar manner. The pressure release wall, by way of a corresponding shaping of the detent and the pressure release wall, can serve for enlarging the faces which are available for deflecting pressurized fluids.

A further advantageous design embodiment can provide that the detent has a substantially linear detent edge.

A termination of a free end of the detent is enabled by using a linear (straight) detent edge on the detent. The detent edge can at least partially straddle the pressure release opening, for example. A thus defined termination is correspondingly formed so as to thereon optionally achieve an outflow of the pressurized gas, or else to make available a defined path for a second pivot point of the pressure release wall, respectively. The linear detent edge can be aligned so as to be substantially parallel to a pivot point of the pressure release device that runs in a linear manner. A ready response and a preferably defined deflection or deformation, respectively, of the pressure release wall is thus facilitated.

It can furthermore advantageously be provided that the pressure release wall has a flap with a linear motion axis, in particular a pivot axis.

A linear motion axis, in particular a pivot axis, has the advantage that the flap is movable about this axis and at least in portions can carry out a rotating movement. For example, a hinge of the flap herein can be disposed in the linear motion axis, or a bending axis of the flap can be provided therein, respectively. A first pivot point can be disposed in the linear motion axis. Accordingly, the flap can bear so as to be movable on a peripheral region of the pressure release opening, for example. In order for a responsive behavior of the flap to be controlled, the pressure release wall can be secured by way of hold-down devices (securing means) in the peripheral region of the pressure release opening, for example. The further fastening means (hold-down devices) can be, for example, bolts, adhesively bonded locations, clamping connections or similar which have predetermined breaking points and which are destroyed or cancelled (for example clamping connections) when impinged with pressure and thus release a movement of the pressure release wall that is driven by a differential pressure.

A further advantageous design embodiment can provide that the flap for opening moves in the direction of an operator panel of an electrical cabinet.

An electrical cabinet serves for receiving electrical installations such as, for example, relays, air gap switches, control assemblies, regulating and automating installations, cables, lines, switches, grounding points, etc. The electrical cabinet has an operator panel in order for an installation located in the electrical cabinet to be operated, accessibility to the interior of the electrical cabinet being possible from said operator panel. A flap can preferably move in the direction of the operator panel so as to expose the pressure release opening. An operator aisle which can be utilized by personnel can be disposed at an operator panel, for example. A defined deflection or movement, respectively, of the flap can thus be generated in particular in combination with a detent such that exiting fluid can be directed to preferred regions, for example to central regions or remote regions on an electrical cabinet, on account of which relaxing of the exiting fluid can be achieved there by turbulence, for example.

A further advantageous design embodiment can provide that the pressure release wall is deformable about a pivot point.

A movement of the pressure release wall, or at least of parts of the pressure release wall, respectively, can be performed about a pivot point. A pivot point can lie, for example, on a detent, or on a periphery of a pressure release opening, respectively, on account of which forming, in particular pivoting of the pressure release wall, about the pivot point can be forced at least in portions of said pressure release wall. The responsive behavior and the type of the deformation of the pressure release wall can thus be controlled as a function of the design of the pressure release wall in a deformation region, for example. For example, forming or bulging, respectively, or similar on the pressure release wall can be achieved by a weakening of the material along specific paths, for example along a linear path, along two intersecting paths, on account of which a deformation at least of portions of the pressure release wall while bearing on the detent can preferably be achieved. A plastic deformation of the pressure release wall herein can take place in particular upon the pressure release wall impacting on the detent, in particular about a second pivot point, on account of which securing the pressure release wall in a form-fitting manner on the detent can be achieved. A spontaneous movement, for example a reverse movement or a swinging movement or a pendulum movement of the pressure release wall upon a response of the latter, is thus prevented. The plastic deformation can be caused by the pressurized fluids, for example. A detent edge of the detent can be at least partially covered by the pressure release wall after any deformation. For example, a hook about the detent can be configured in a plastically deformed manner by the deformation of the pressure release wall, for example, so that blocking of the pivoting movement is caused almost entirely by the plastically deformed pressure release wall. The pressure release wall preferably operates in a self-securing manner.

A further advantageous design embodiment can provide that an electrical cabinet has a pressure release device.

An electrical cabinet has a housing which in the interior thereof delimits a receptacle space. The receptacle space is bordered by walls of the housing. A pressure release device according to one of the preceding design embodiments is disposed in a wall of the electrical cabinet. The wall can be an external wall, an internal wall, a wall of a special fluid duct, or similar. The pressure release device herein can preferably be installed in a substantially horizontal wall of the electrical cabinet. This horizontal wall can preferably be a cover wall of the housing, a base area of the electrical cabinet being straddled by means of said cover wall. The cover face herein can also deviate from a flat shape and can run in the manner of a saddle, for example, or similar. The electrical cabinet can have metallic walls, for example, wherein a fluid tightness of the electrical cabinet is not mandatory. The electrical cabinet need only have sealing which insulates in relation to flows, wherein a response of the pressure release device is to be provided when the fluid flow in the interior of the electrical cabinet increases excessively.

A further object of the invention is to specify a method for operating a pressure release device which controls a passability of a pressure release opening by means of a movable pressure release wall.

The further object herein is achieved in that the pressure release wall is moved when an overload pressure arises; the pressure release wall impacts a detent; and the pressure release wall when bearing on the detent is moved onward at least in portions.

An overload pressure can arise within a closed receptacle space, for example an electrical cabinet, wherein the overload pressure in relation to the environment, or in terms of an adjacent further receptacle space, respectively, is defined as a differential pressure. In order to prevent any uncontrolled bursting of the receptacle space, a differential pressure in relation to an adjacent region which is able to be connected by way of the pressure release opening can be reduced by means of the pressure release wall. When an overload pressure arises the pressure release wall impacts on a detent, wherein the pressure release wall, while hugging the detent, is moved onward at least in portions. On account thereof, the possibility of securing the pressure release wall on the detent in order to terminate the movement of said pressure release wall and for enabling fluid to be extracted in a directed manner through the pressure release opening is provided.

An advantageous design embodiment herein can provide that plastic forming of the pressure release wall takes place in particular on the detent.

On account of the pressure release wall being plastically formed on the detent, the detent can at least in portions be encased by means of the pressure release wall, wherein the pressure release wall preferably bears on the detent and encompasses the detent, in particular a detent edge. A securing hook on account of the formed portions of the pressure release wall per se is thus generated by plastic forming.

It can furthermore advantageously be provided that securing the pressure release wall in a form-fitting manner on the detent takes place on account of the forming.

Engaging behind the detent by portions of the pressure release wall can preferably be generated on account of the form-fit, on account of which a detent edge at least in portions is preferably largely encompassed/covered by the pressure release wall, for example.

An exemplary embodiment of the invention will be schematically shown in a drawing hereunder and be described in more detail in the following.

DETAILED DESCRIPTION OF THE INVENTION

Figure 1:
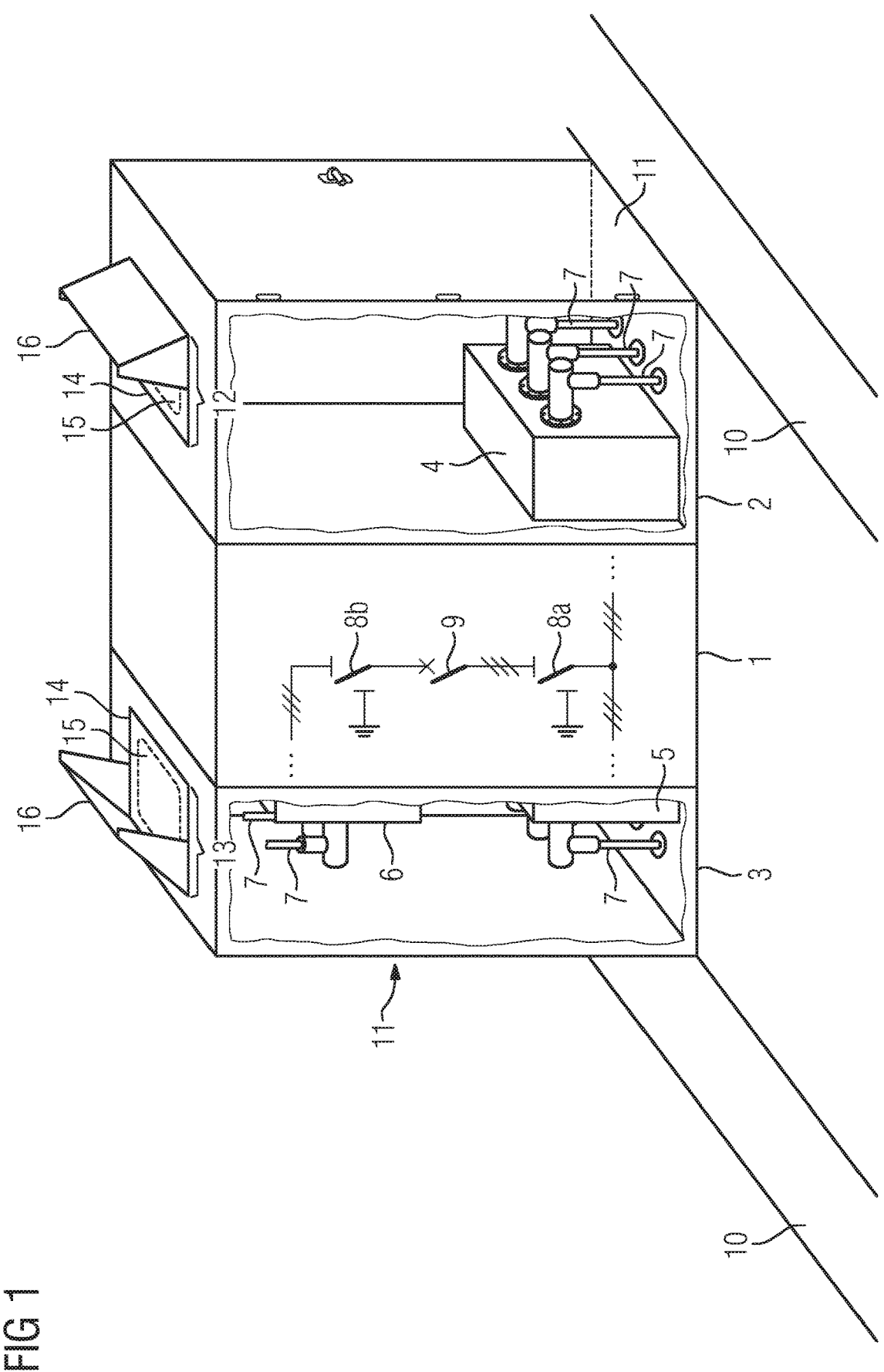
FIG. 1 shows a perspective view of two electrical cabinets having in each case one pressure release device.

FIG. 1 in a perspective view shows a gas-insulated control panel 1 which has an encapsulation housing. The encapsulation housing in the interior thereof houses electrical switching apparatuses in a receptacle space. The receptacle space is hermetically sealed in relation to the environment and is filled with a pressurized electrically insulating fluid, for example a gas. A first electrical cabinet 2 as well as a second electrical cabinet 3 are disposed at opposite sides of the gas-insulated control panel 1 so as to be proximal to the casing. While the encapsulation housing of the gas-insulated control panel 1 enables a receptacle space to be hermetically encapsulated, the receptacle spaces of the first as well as the second electrical cabinet 2, 3 are filled with atmospheric air, wherein a communication between the atmospheric air located in the interior of the two electrical cabinets 2, 3 and the environment of the gas-insulated control panel 1 as well as of the first and the second electrical cabinet 2, 3 is possible.

Illustrated in an exemplary manner in FIG. 1 are the gas-insulated control panel 1, the first electrical cabinet 2, the second electrical cabinet 3 having in each case a cuboid basic structure. Shapes deviating therefrom can moreover also be used.

A first molding 4 on the gas-insulated control panel 1 protrudes into the receptacle space of the first electrical cabinet 2. Furthermore, a second molding 5 as well as a third molding 6 of the gas-insulated control panel 1 protrude into the receptacle space of the second electrical cabinet 3. The moldings 4, 5, 6 serve for receiving so-called plug connectors by means of which cable connectors 7 can be introduced into the interior of the gas-insulated control panel 1. The plug connectors thus offer the possibility of guiding in an electrically insulated manner through a wall of the gas-insulated control panel 1 a phase conductor of the respective cable connectors 7 into the interior of the gas-insulated control panel. Cable plugs which in terms of shape are configured so as to be complementary to the plug connectors herein can be disposed on the cable connectors 7. The cable plugs presently are configured as angled plugs such that routing of cable connectors 7 from the base region of the two electrical cabinets 2, 3 is initially enabled to the plug connectors of the first molding 4 as well as of the second molding 5. Plug connectors by means of which corresponding cable connectors 7 can be electrically contacted by way of angled plugs of the same type are likewise disposed on the third molding 6.

The interior of the gas-insulated control panel 1 in FIG. 1 is schematically illustrated using a so-called single-line diagram. As can be seen, the phase conductors of the cable connectors 7 which are located on the first molding 4, or on the second molding 5, respectively, are permanently connected so as to be in contact in an electrically conducting manner, said phase conductors being introduced into the interior of the gas-insulated control panel 1. Extending from this connection is a branch by way of the first circuit breaker 8a, a power switch 9, as well as a second circuit breaker 8b to the plug connectors of the third molding 6. Accordingly, so-called looping of a cable connection through the gas-insulated control panel 1 is enabled by way of the first molding 4 as well as the second molding 5, wherein the gas-insulated control panel 1 again has a branch so as to configure an output to a further consumer or to an infeed. The two circuit breakers 8a, 8b, presently are configured as so-called three-position breakers, on account of which there is the possibility of contacting in an electrically conducting manner a ground contact by way of the switch contacts of the two circuit breakers 8a, 8b, said switch contacts being in each case movable. An electrically insulating fluid is disposed at an overload pressure in the receptacle space in the interior of the gas-insulated control panel 1; said fluid herein can be a fluoride-containing gas such as sulfur hexafluoride, fluoroketone, fluoronitrile, or else purified atmospheric air as well as $CO_2$ and mixtures with these substances.

An operator aisle 10 is disposed in front of an operator panel on the side of the first or the second electrical cabinet 2, 3, respectively, that faces away from the gas-insulated control panel 1. Personnel can approach the first or the second electrical cabinet 2, 3, respectively, by way of the operator aisle 10. One opening on the electrical cabinet 2, 3 is in each case disposed so as to face the respective operator aisle 10, said openings being able to be closed in each case by means of a cabinet door 11, for example. Access to the receptacle spaces of the first or the second electrical cabinet 2, 3, respectively, is provided by way of the cabinet doors 11. The cabinet doors 11 herein close in each case the two electrical cabinets 2, 3, wherein this is not a hermetic closure of the electrical cabinet 2, or of the first and the second electrical cabinet 2, 3, respectively. The components, for example the cable connectors 7, the cable plugs, or the plug connectors, etc., which are disposed within the receptacle spaces of the first and the second electrical cabinet 2, 3, respectively, may have a malfunction. For example, electrical surges at the cable connectors 7 can lead to a destruction of insulation materials of the cable connectors 7. For example, electric arcs can appear in the receptacle spaces of the first or the second electrical cabinet 2, 3, respectively, on account of which an overload pressure can be created in the interior of the first or the second electrical cabinet 2, 3, respectively, for example by virtue of evaporation which appears in metals or insulation materials. In order to prevent any undefined bursting of the first or the second electrical cabinet 2, 3, respectively, a first pressure release device 12 is disposed on the first electrical cabinet 2, and a second pressure release device 13 is disposed on the second electrical cabinet 3. The two pressure release devices 12, 13 are of substantially identical construction, wherein each of the pressure release devices 12, 13 has in each case one pressure release wall 14. The respective pressure release wall 14 in the regular operation plugs a pressure release opening 15. The pressure release openings 15 are in each case incorporated in walls of the respective electrical cabinet 2, 3, said walls covering the base area of the respective electrical cabinet 2, 3. An exit direction of fluid through the pressure release opening 15 is thus provided in a substantially vertical direction. The two pressure release devices 12, 13 furthermore have in each case one detent 16. A fluid-tight embodiment of an electrical cabinet 2, 3 can also be provided if required. In this case, a fluid-tight closure of the pressure release opening 15 by way of the pressure release wall 14 is also to be provided.

Figure 2:
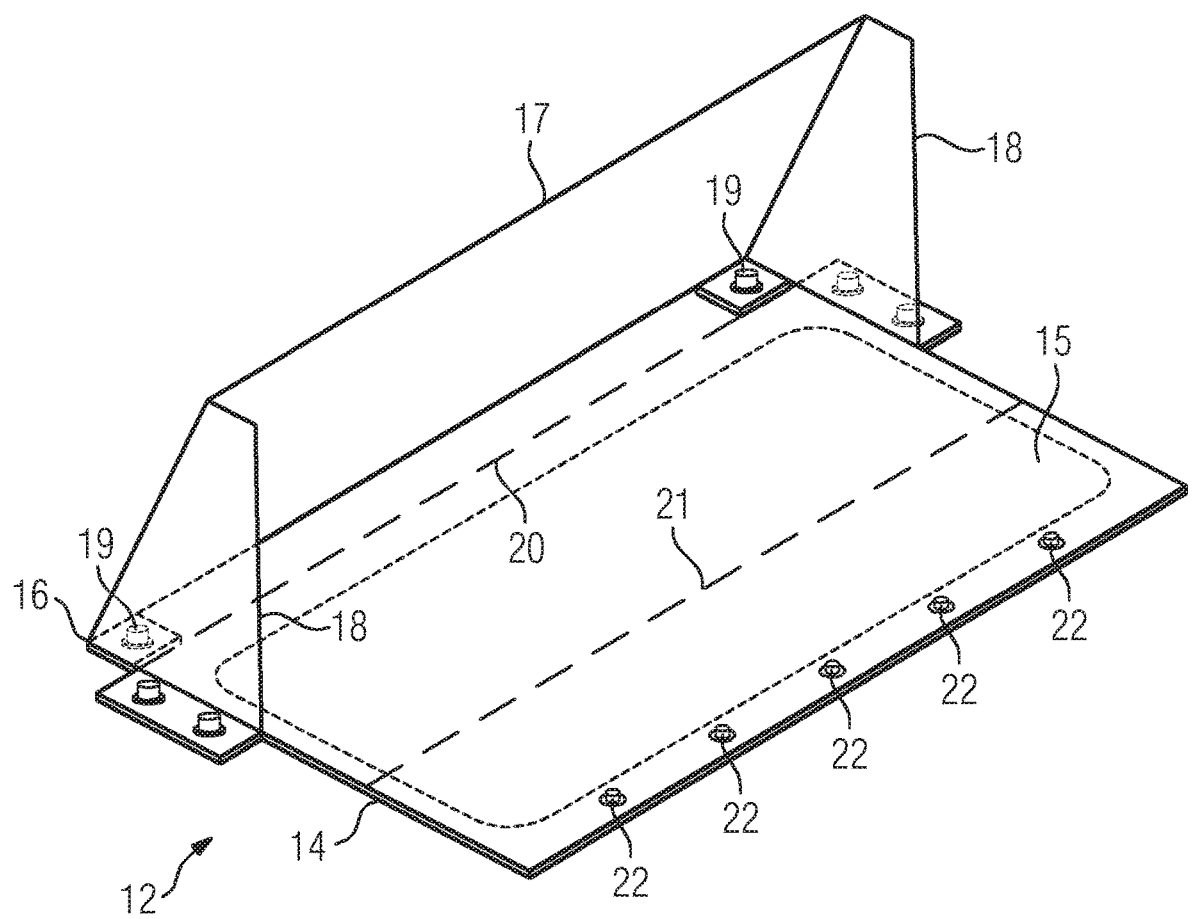
FIG. 2 shows an enlarged illustration of a pressure release device.

The construction and the operating mode of the pressure release devices 12, 13 based on FIG. 2 will be described in an exemplary manner hereunder by means of the first pressure release device 12. A perspective view of the first pressure release device 12 is shown in FIG. 2. The perspective herein is chosen in such a manner that a depiction of the first pressure release device 12 in FIG. 2 takes place from a direction that faces away from the observer of FIG. 1. The pressure release opening 15 has a substantially rectangular cross section, wherein rounding of the corners of the pressure release opening 15 is provided here, for example. The cross section of the pressure release opening 15 is completely covered by the pressure release wall 14 such that the passability of the pressure release opening 15 is heavily restricted. Plugging of the pressure release opening 15 by way of the respective associated pressure release wall 14 here is not required in a hermetically sealing manner. The pressure release wall 14 herein, by way of the rectangular sides thereof, is in each case disposed so as to be parallel to the rectangular sides of the pressure release opening 15. The pressure release opening 15 per se herein forms a pressure release duct. It can also be provided that a pressure release device according to the invention is disposed in a separate pressure release duct.

A detent 16 is disposed on one side of the pressure release wall 14, presently on a longitudinal side of the pressure release wall 14. The detent 16 has a straight detent edge 17. The detent 16, from the detent edge 17 up to the wall of the first electrical cabinet 2 which supports the detent 16, has a substantially flat continuous face. The detent 16 herein bears on a wall of the first electrical cabinet 2 and extends obliquely across the pressure release opening 15 such that the detent 16 straddles the pressure release opening 15. The detent edge 17 is in particular disposed above the direction of passage (here the vertical direction), so as to be spaced apart from the pressure release opening 15. Guide elements 18 which are shaped so as to be planar are connected to the detent 16 in order for the detent edge 17 to be stabilized. The guide elements 18 form in each case planar guide faces which extend on both sides of the detent edge 17. A shaded region (cover, duct) which extends in a parallel manner on one side of the pressure release opening 15, on the one hand, and at the ends of the pressure release wall 14 enables a lateral (end-proximal) delimitation and support of the detent 16, on the other hand, is thus achieved. Lugs which enable the detent 18 to be screw-fitted to a wall of the first electrical cabinet 2 as well as to the pressure release wall 14 are disposed on the base region on the guide elements 18 of the detent 16.

A fastening of the pressure release wall 14, presently by means of two bolts 19 here, is provided in the shaded region of the detent 16. A first pivot point 20 in the form of a straight line extends between the bolts 19. A second pivot point 21 is provided so as to be parallel to the straight or linear, respectively, first pivot point 20. The second pivot point 21 lies so as to be parallel to the first pivot point 20 and lies in the face of the pressure release wall 14. A weakening of the material of the pressure release wall 14 can be provided if required, in order for the first pivot point 20, or the second pivot point 21, respectively, to be facilitated or pronounced, respectively.

In order for a detachment of the pressure release wall 14 from the first electrical cabinet 2 to be impeded, a fastening of further portions of the pressure release wall 14 by means of securing means 22 (hold-down devices) is able to be provided preferably so as to be parallel to the profile of the edges of the body of the pressure release opening 15. The securing means 22 presently are bolts having predetermined breaking points such that a detachment of the securing means 22 if required can take place as a function of an overload pressure.

Figure 3:
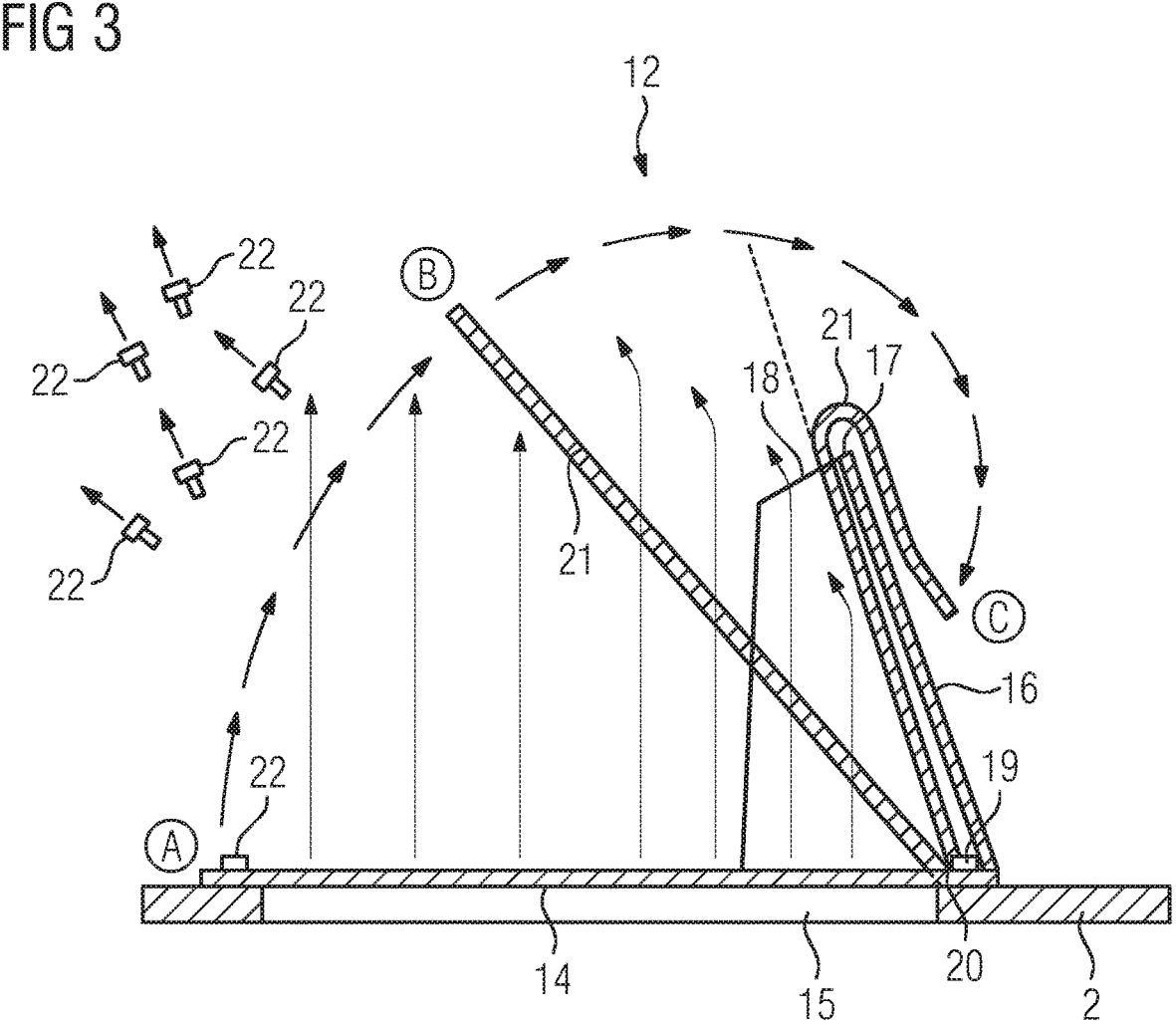
FIG. 3 shows a section through a pressure release device with a temporal sequence of a relative movement.

A section through the first pressure release device 12 is illustrated in FIG. 3, said section corresponding to the perspective of FIG. 1. Three different temporal points Ⓐ, Ⓑ, Ⓒ, are illustrated in FIG. 3 herein, said temporal points depicting a temporal sequence of a response of the pressure release device 12. At a neutral temporal point Ⓐ, that is to say at a malfunction-free temporal point as is also illustrated in FIGS. 1 and 2, the pressure release wall 14 is established by way of the bolts 19, or the securing means 22, respectively, so as to plug the pressure release opening 15. The detent 16 straddles the pressure release opening 15, wherein the guide elements 18 enable the pressure release wall 14 to be mechanically stabilized on both sides. At a temporal point of an overload pressure in the interior of the first electrical cabinet 2, that is to say when a malfunction (for example an electric arc) arises in one of the cable connectors 7 at the first molding 4, an overload pressure can arise, wherein a differential pressure between the receptacle space of the first electrical cabinet 2 and the environment of the first electrical cabinet 2 becomes so large that the predetermined breaking points of the securing means 22 are detached. Driven by the pressure differential, that is to say the overload pressure in the interior of the receptacle space, the pressure release wall 14 of the first pressure release device 12 is pivoted about the first pivot point 20. The pressure release opening 15 is exposed in the manner of a flap. The fluid flowing out of the receptacle space (said fluid being expanded by an electric arc, for example) drives the pressure release wall 14 onward in the direction of the detent 16 (from position Ⓐ to Ⓑ). The movement, or the forming, respectively, of the pressure release wall 14 along the first pivot point 20 herein is facilitated on both sides by the guide elements 18. The guide elements 18, by virtue of the design embodiment of the guide faces 18 in a planar compact manner, simultaneously also serve for directing the outflowing fluid. The outflowing fluid pushes the pressure release wall 14 against the detent 16, wherein the second pivot point 21 initially comes to rest in the region of the detent edge 17 of the detent 16. The second pivot point 21 is preferably situated above the detent edge 17 so that the fluid, while pressing the pressure release wall 14 against the detent 16, in a simple manner moves onward the free end which is not supported by the detent 16 of the pressure release wall 14. The pressure release wall 14 is deformed about the second pivot point 21, wherein this pivoting, or the configuration of the second pivot point 21, respectively, is facilitated by the detent edge 17. The pressure release wall 14 places itself about the detent edge 17 and by way of plastic deformation ensures that the pressure release wall 14 bears on the detent 16 (Ⓒ). The pressure release wall 14 completes a pivoting movement in the manner of a flap, wherein the flap moves in the direction of the associated operator aisle 10. A deflection of the fluid from the interior of the receptacle space of the first electrical cabinet 2 from the associated operator aisle 10 is caused by the detent 16 and the pressure release wall 14 which is secured on said detent 16. This is facilitated by the deformation of the pressure release wall 14. An enlargement, or an increase in length, respectively of the directing effect of the detent 16 takes place on account of the detent 16 being encased by the deformed pressure release wall 14 in interaction with the guide elements 18.

Instead of portions of the pressure release wall 14 being formed, it can also be provided that corresponding hinges for configuring pivot points 20, 21 are disposed at the preferred positions. It can also be provided that bursting of the pressure release wall 14 takes place, wherein preferred bursting paths are optionally predefined by profiled features of the pressure release wall 14. In bursting, there is always a residual risk of undefined bursting deformations. Directing and guiding exiting fluids, or portions of the pressure release wall 14, respectively, by the detent 16 or the detent edge 17, respectively, is particularly important here.

The invention claimed is:

1. A pressure release device, comprising:
   a pressure release wall configured to control a passability of a pressure release opening, said pressure release wall being mounted for movement relative to said pressure release opening and said pressure release wall being deformable about a pivot point; and
   a detent disposed in a motion path of said pressure release wall.

2. The pressure release device according to claim 1, wherein said pressure release wall has a first pivot point, and wherein a second pivot point is disposed in said pressure release wall.

3. The pressure release device according to claim 1, comprising at least one guide element for said pressure release wall disposed to support said detent.

4. The pressure release device according to claim 1, wherein said detent at least partially straddles said pressure release opening.

5. The pressure release device according to claim 1, wherein said detent has a substantially linear detent edge.

6. The pressure release device according to claim 1, wherein said pressure release wall has a flap with a linear motion axis.

7. The pressure release device according to claim 6, wherein said linear motion axis is a pivot axis of said flap.

8. The pressure release device according to claim 6, wherein an electrical switchgear cabinet has an operator panel and said flap is mounted, for opening the pressure release device, to move in a direction of the operator panel.

9. An electrical cabinet, comprising the pressure release device according to claim 1.

10. A method of operating a pressure release device, the method comprising:
- providing a movable pressure release wall to control a passability of a pressure release opening with the pressure release wall;
- wherein the pressure release wall is moved when an overload pressure arises;
- wherein the pressure release wall impacts a detent; and
- with the pressure release wall bearing against the detent, moving the pressure release wall onward at least in portions; and
- with the pressure release wall abutting the detent, plastically deforming the pressure release wall.

11. The method according to claim 10, which comprises plastically deforming the pressure release wall to secure the pressure release wall in a form-fitting manner on the detent.

* * * * *